H. S. NODDINGS.
SINE BAR.
APPLICATION FILED APR. 10, 1920.
1,374,759.
Patented Apr. 12, 1921.
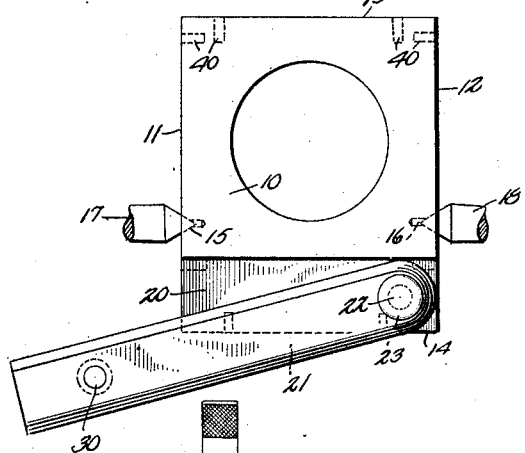
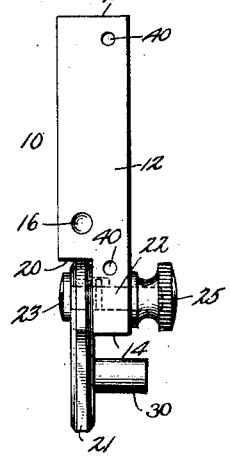
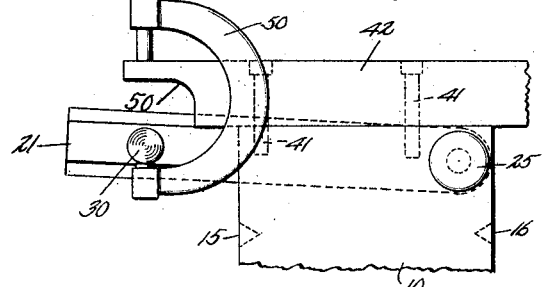
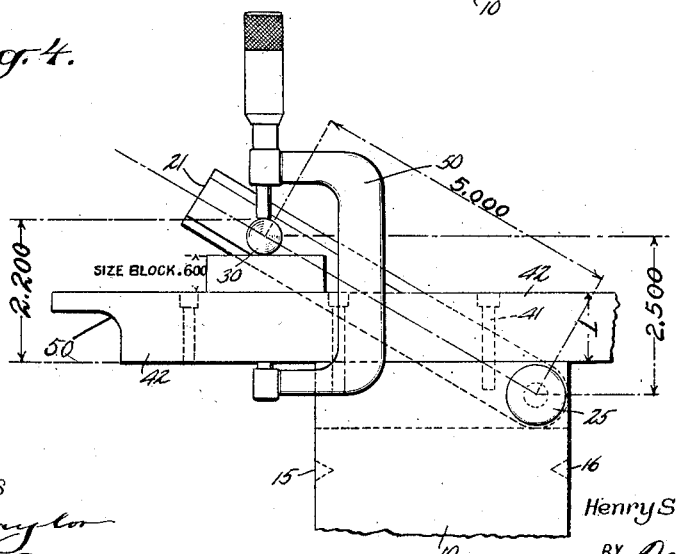
WITNESSES
INVENTOR
Henry S. Noddings
BY
ATTORNEYS

UNITED STATES PATENT OFFICE.

HENRY STEWART NODDINGS, OF SPRINGFIELD, MASSACHUSETTS.

SINE-BAR.

1,374,759.   Specification of Letters Patent.   Patented Apr. 12, 1921.

Application filed April 10, 1920. Serial No. 372,782.

*To all whom it may concern:*

Be it known that I, HENRY S. NODDINGS, a citizen of the United States, and a resident of Springfield, in the county of Hampden and State of Massachusetts, have invented a new and Improved Sine-Bar, of which the following is a full, clear, and exact description.

The invention relates to measuring instruments and its object is to provide a new and improved sine bar arranged for convenient use on metal working tools such as lathes, milling machines, planers, shapers, grinders and the like, and to permit accurate testing or inspecting of all kinds of machine work.

Another object is that by the use of the improved sine bar chances of errors in setting machine tools for making accurate angles are reduced to a minimum and the user is enabled to set readily, quickly and accurately the sine bar to the desired angle.

Another object is to enable different workmen to use the same sine bar in the production of duplicate work.

Another object is to permit of setting the sine bar for external or internal tapers which are accurate one relative to the other.

With these and other objects in view, the invention consists of certain novel features of construction as hereinafter shown and described and then specifically pointed out in the claims.

A practical embodiment of the invention is represented in the accompanying drawings forming a part of this application, in which similar characters of reference indicate corresponding parts in all the views.

Figure 1 is a side elevation of the improved sine bar;

Fig. 2 is an edge view of the same;

Fig. 3 is a side elevation of the sine bar as set for an angle of six degrees; and Fig. 4 is a similar view of the same as set for an angle of thirty degrees.

Metal working machines such as lathes, milling machines, grinders, planers, shapers and the like are usually accurate to within one-thousandth of an inch when doing straight work, but when doing a job requiring angular measurement it is left entirely to the skill of the machinist or tool-maker to do the work accurately as the degree graduation on the machine is not sufficiently accurate for accurate work. Thus an error of 5 minutes in the graduation means an error of 8/1000 of an inch in a distance of about 6 inches of the work. With my improved sine bar presently described in detail a machinist or tool-maker is enabled to set the machine for making accurate angles.

The block 10 has its sides 11 and 12 parallel and at right angles to the sides 13 and 14, which latter are hence parallel one to the other. The sides 11 and 12 are provided with center holes 15 and 16 adapted to be engaged by centers 17 and 18 of a lathe or other machine on which the sine bar is to be used to support the block 10. The center holes 15 and 16 have a common axis which is parallel to the sides 13 and 14.

The block 10 is provided on one face at the side 14 with a reduced portion 20 along which extends a measuring bar 21 mounted to swing on a pivot 22 held at one end of the reduced portion 20. The head 23 of the pivot 22 engages the outer face of the measuring bar 21, and the pivot 22 is provided at its free end with a nut 25 abutting against the outer face of the block 10 to clamp the measuring bar 21 in an adjusted position. The measuring bar 21 is provided near its free end with a button 30, the center of which is located a predetermined distance from the center of the pivot 22.

Each of the sides 11, 12, 13 and 14 of the block 10 is provided with tapped recesses 40 adapted to be engaged by screws 41, used for fastening a bar 42 in position on the corresponding sides 11, 12, 13 and 14. It is understood that the bar 42 has parallel sides. By reference to Fig. 3 it will be noticed that the sine bar is used for measuring different distances between the button 30 and the outer face of a bar 42 by the use of a micrometer 50 of usual construction. In the examples shown and presently described, the linear measurement is given in inches and fractions thereof but it is understood that I do not limit myself to this particular linear measurement.

In practice, the diameter of the button 30 is .600 and the center of the pivot 22 is the same distance from the sides 12 and 14. The distance between the centers of the pivot 22 and the button 30 is 5.00 and the width of the bar 42 is one inch. As shown in Fig. 4, the sine bar is set for a 6 degree angle, and as the sine of 6 degrees is .10453, this, multiplied by 5 equals .52265. When the sine bar is at zero, the distance from the top of bar 42 to the center of the button is 1.600, and to measure with the micrometer it is necessary to subtract .52265 from 1.600 thus equaling 1.07735, which is the distance from the center of the button 30 to the top of the bar 42. As the micrometer measures from the top of the bar 42 to the lower edge of the button 30 it is necessary to add .300, that is, one-half of the diameter of the button 30 and the result is 1.37735, which represents the correct height from the lower edge of the button to the top of the bar. In Fig. 4 is shown the sine bar set for an angle of 30°. The sine of 30 degrees is .500, which multiplied by 5, the distance between the centers, equals 2.500. Measuring with a micrometer 50 from the bottom of the bar to the top of the button 30, it is necessary to add .300, which is half the diameter of the button; the result is 2.800 from which is subtracted .600 the distance from the bottom of the bar 42 to the center of the pivot, thus obtaining 2.200 which represents the distance from the bottom of the bar 42 to the top of the button 30. Another method is to use the size block between the lower edge of the button 30 and the top of the bar 42.

Half the diameter of the button 30 is_ .300
Thickness of bar_____ 1.000
Distance between bar 42 and center of pivot 22 is_____ .600

Total_____ 1.900 which subtracted from 2.500 leaves .600. The bar 42 on the side 14 is provided with a step 50 so that the button 30 does not strike the bar 42 when measuring slight angles.

In using the sine bar, the block 10 is placed between the centers of a lathe or other machine with the centers 17 and 18 engaging the center holes 15 and 16, as indicated in Fig. 1. An indicator is used on the tool post and the operator adjusts the compound rest or taper attachment until the indicator needle shows same at each end of the sine bar. The lathe or grinder is then set for turning or grinding precision angles. Any number of men using this tool can produce absolutely duplicate angles, and for either external or internal tapers the block 10 is reversed on the centers 17 and 18. The external and internal tapers are absolutely accurate one relative to the other. When inspecting a tapered spiral reamer which has been ground on centers, the usual method of inspection is to use an expensive taper ring gage. The improved sine bar shown and described is set to the desired angle then the compound rest or taper attachment on the lathe is adjusted by using an indicator until the sine bar and compound rest are parallel. The work is placed on centers and is tested with the indicator. This procedure will also show whether the reamer is sprung or not.

It is understood that the sine bar can be set to any angle within a half circle or 180°.

Having thus described my invention, I claim as new and desire to secure by Letters Patent:—

1. A measuring instrument, comprising a supporting block provided at its sides with centering holes adapted to be engaged by supporting centers, the center holes having a common axis parallel with the top and bottom of the block, a measuring bar and a clamping pivot held transversely on the said supporting block, and on which one end of the measuring bar is mounted to swing.

2. A measuring instrument, comprising a supporting block provided at opposite sides with center holes having a common axis parallel with the top and bottom of the block, a clamping pivot held on one corner of the block, a nut screwing on the said pivot and adapted to abut against the face of the block, and a measuring bar mounted to swing at one end on the said pivot and adapted to be clamped against the block on screwing up the said nut, the said measuring bar being provided at its free end with a button.

3. A measuring instrument, comprising a supporting block provided at the sides with center holes adapted to be engaged by centers to support the block on a machine, the center holes having a common axis parallel with the top and bottom of the block, the block having a lengthwise extending reduced portion, a measuring bar at the said reduced portion, a clamping pivot on the said reduced portion and on which the said measuring bar is mounted to swing, and a button held on the free end of the said measuring bar.

4. A measuring instrument, comprising a supporting block provided at its sides with centering holes adapted to be engaged by supporting centers, the center holes having a common axis parallel with the top and bottom of the block, a clamping pivot held transversely on the said supporting block on which one end of the measuring bar is mounted to swing, a bar, and means removably fastening the said bar to the sides, top and bottom of the block.

5. A measuring instrument, comprising a supporting block provided at the sides with center holes adapted to be engaged by centers to support the block on a machine, the center holes having a common axis parallel with the top and bottom of the block, the block having a reduced portion, a measuring bar at the said reduced portion, a clamping pivot on the said reduced portion and on which the said measuring bar is mounted to swing, a button held on the free end of the said measuring bar, a bar, and means removably fastening the said bar to either of the sides, top or bottom of the block.

HENRY STEWART NODDINGS.